(12) United States Patent
Presenz et al.

(10) Patent No.: US 7,442,333 B2
(45) Date of Patent: Oct. 28, 2008

(54) METHOD FOR THE PRODUCTION OF POLYAMIDE NANOCOMPOSITES, CORRESPONDING PACKAGING MATERIALS AND MOULDED BODIES

(75) Inventors: Ulrich Presenz, Trin (CH); André Marcus Sutter, Bonaduz (CH)

(73) Assignee: EMS-Chemie AG, Domat/EMS (CH)

( * ) Notice: Subject to any disclaimer, the term of this patent is extended or adjusted under 35 U.S.C. 154(b) by 142 days.

(21) Appl. No.: 10/503,079

(22) PCT Filed: Jan. 30, 2003

(86) PCT No.: PCT/CH03/00077

§ 371 (c)(1),
(2), (4) Date: May 4, 2005

(87) PCT Pub. No.: WO03/064503

PCT Pub. Date: Aug. 7, 2003

(65) Prior Publication Data

US 2005/0215690 A1   Sep. 29, 2005

(30) Foreign Application Priority Data

Jan. 30, 2002   (WO) ............... PCT/CH03/00077

(51) Int. Cl.
- B29C 47/60  (2006.01)
- B29C 47/38  (2006.01)
- B32B 27/00  (2006.01)
- C08J 5/00   (2006.01)
- C08K 3/34   (2006.01)

(52) U.S. Cl. ............. 264/211.23; 264/110; 264/173.14; 264/211.21; 264/311.12; 264/311.19; 524/442; 524/445; 524/447; 524/449

(58) Field of Classification Search .............. None
See application file for complete search history.

(56) References Cited

U.S. PATENT DOCUMENTS

| 4,739,007 | A |   | 4/1988  | Okada et al. |
| 4,810,734 | A |   | 3/1989  | Kawasumi et al. |
| 4,857,600 | A | * | 8/1989  | Gross et al. ............ 525/285 |
| 5,475,049 | A | * | 12/1995 | Ohtomo et al. .......... 524/449 |
| 5,597,235 | A | * | 1/1997  | Barnes et al. ............ 366/76.6 |
| 5,747,560 | A | * | 5/1998  | Christiani et al. ........ 523/209 |
| 6,417,262 | B1 | * | 7/2002 | Turner et al. ............ 524/445 |
| 6,515,099 | B2 | * | 2/2003 | Sato et al. ............... 528/310 |
| 6,517,920 | B1 | * | 2/2003 | Schroder et al. ......... 428/36.7 |
| 6,812,273 | B1 | * | 11/2004 | Brima et al. ........... 524/450 |
| 6,890,091 | B2 | * | 5/2005 | Murakami et al. ....... 366/77 |
| 2001/0056148 | A1 | * | 12/2001 | Sato et al. ............ 524/442 |

FOREIGN PATENT DOCUMENTS

| DE | 198 47 844 A1 | 4/2000 |
| EP | 0 598 836 B1 | 10/1997 |
| EP | 0 940 430 A1 | 9/1999 |
| EP | 1 156 073 A1 | 11/2001 |
| JP | 11-279289 A | 10/1999 |
| WO | WO 93/04117 A1 | 3/1993 |
| WO | WO 00/34372 A1 | 6/2000 |

OTHER PUBLICATIONS

Todd, David B. "Improving Incorporation of Fillers in Plastics: A Special Report," Advances in Polymer Technology, vol. 19, No. 1, pp. 54-63 (2000).*

Anderson, Paul G. "SPE Antec 2002—Proceedings of the 60th Annual Technical Conference and Exhibition", May 5-9, 2002, San Francisco, California.*

* cited by examiner

Primary Examiner—Monica A Huson
Assistant Examiner—Jeff Wollschlager
(74) Attorney, Agent, or Firm—Browdy and Neimark

(57) ABSTRACT

The invention relates to a method for the production of polyamide nanocomposites made from base polymers comprising aromatic components and organically-modified phyllosilicates in a double-screw extruder with a front-feeder and a side-feeder. Said method is characterised in that a portion (A) from 8 to 15 wt. % of a granulate of the base polymer is introduced in the front-feeder of the double-screw extruder and the main portion (B) of said granulate of the base polymer is introduced by means of the side feeder of the double-screw extruder and that 2 to 8 wt. % of the modified phyllosilicate is introduced into the melt of the granulate portion (A) of the base polymer, whereby the wt. % proportions relate to the finished polyamide nanocomposite. According to the invention, packaging materials with high UV absorption and improved gas and aroma barrier effect can be produced by said method. Furthermore, the corresponding packagings the use thereof and moulded bodies produced by means of said method are disclosed.

11 Claims, No Drawings

METHOD FOR THE PRODUCTION OF POLYAMIDE NANOCOMPOSITES, CORRESPONDING PACKAGING MATERIALS AND MOULDED BODIES

RELATED PATENT APPLICATIONS

This patent application claims priority of the international application No. PCT/CH03/00077 filed on Jan. 30, 2003, which in turn claims priority of the international application No. PCT/CH02/00052 filed on Jan. 30, 2002. The whole content of these two international applications is introduced by reference into the present application.

RELATED TECHNICAL BACKGROUND

The present invention relates to a method for the production of polyamide nanocomposites made from polyamides and phyllosilicates according to the preamble of claim 1. Polyamide nanocomposites produced according to the present method in accordance with the invention can be used for producing transparent packaging means, especially packaging means with high UV absorption, as well as improved gas and aroma barrier effect. Moreover, the polyamide nanocomposites produced in accordance with the invention further offer the possibility of producing moulded bodies, hollow bodies, semi-finished products, plates, tubes, etc., even such of larger thickness or wall thickness.

In the field of plastic, nanocomposites materials are understood as polymer formulations which comprise finely dispersed phyllosilicates such as clay minerals within the polymer matrix. The relevant aspect is that the phyllosilicates are exfoliated up to the individual layers, i.e. they are split up and then dispersed. The properties of such nanocomposites have already been published in numerous patent specifications and specialised publications. It is known that finely dispersed clay minerals or phyllosilicates provide the composite with improved properties such as increased mechanical strength, improved barrier properties against oxygen and carbon dioxide, among other things. The improvement of the properties of a polymer matrix by means of finely dispersed clay materials has already been described in closer detail in the patents U.S. Pat. Nos. 4,739,007 and 4,810,734 for example.

Nanocomposites have also already entered the packaging sector. The exfoliated clay minerals ensure in packaging films an inhibited diffusion of gas molecules such as oxygen, carbon dioxide or aromatics through the packaging material.

Problems Observed in Prior Art

Polyamides have been established for many years as preferred thermoplastic polymeric materials in the packaging field. One of the main reasons is the property profile of this class of materials such as favourable barrier effect against oxygen and carbon dioxide as well as the outstanding mechanical properties of the packaging foils made of polyamide. When using aliphatic polyamides as a matrix for nanocomposite materials, a reduction in the transparency can be observed because these nanocomposite filling materials are capable of increasing the crystallisation of the aliphatic polyamides, which on the other hand can strongly impair the transparency of such products.

A desirable goal in the packaging field is the polyamide nanocomposite as a part of multiple-layer films in combination with other polymers such as polyolefines. Multiple-layer films which are composed of different types of polymers with mutual adverse adhesion can be rigidly connected with each other by suitable bonding layers. Such multiple-layer films can be used to produce a large variety of packaging products such as containers, bottles, bags, thermomouldable products, tubes, etc. The products can be provided with a dyed, light-permeable or transparent configuration. In order to enable the successful marketing of a large variety of products, the presentation of these products towards the customer plays an increasingly important role. To allow the customers to see what is contained in a packaging, the transparency is of decisive importance. Numerous suitable barrier materials consist of aliphatic polymers. Such compounds usually crystallise during the cooling process and lead to packaging materials with reduced transparency. The reduction of the transparency by the crystallisation process can be remedied by using amorphous, partially aromatic polyamides.

The durability of packaged perishable foodstuffs and other products is defined predominantly by the oxygen barrier of a packaging. The UV barrier also plays a decisive role in numerous other packaging applications because UV rays are able to damage sensitive foodstuffs (like oxygen). When storing sensitive foodstuffs such as meat in the cold shelves of major distributors, they are often subjected to damaging UV radiation because many of the employed light sources also radiate light in the UV spectrum.

Special expensive UV absorbers such as Tinuvin® 234, a hydroxyl phenyl benzotriazole UV absorber produced by Ciba Specialty Chemicals Inc., Basel, Switzerland, can be introduced into the materials which represent components of said multiple-layer composites. Since these UV absorbers can migrate under application conditions, the use of these compounds often requires an additional layer to the multiple-layer composite in order to prevent the migration of the UV absorbers into the packaged product or into the atmosphere. The addition of an additional layer to the multiple-layer film is not possible in all cases because the number of producible layers is defined by the configuration of the film extrusion systems.

The packaging of especially perishable foodstuffs with a further extended durability cannot easily be solved by the packaging systems and additives currently available on the market. Especially the enabling of a combination of all of the following listed properties in a single packaging requires further improvements. Such properties are:

Highly transparent packaging

High mechanical strengths

Extremely high gas barrier effect against oxygen and carbon dioxide

High aroma barrier effect

High UV protection

Additionally extended durability in cold shelves

Official approval as foodstuff packaging

OBJECTS AND SUMMARY OF THE PRESENT INVENTION

The invention is therefore based on the object of providing a method for producing polyamide nanocomposites with which, among other things, it is possible to produce transparent and clear packaging materials or packaging means with high mechanical properties, a high barrier effect against oxygen and carbon dioxide and which simultaneously also offer an increased protection against UV radiation.

With respect to a method for the production of polyamide nanocomposites, this object is achieved according to the features as disclosed herein. With respect to a packaging means with high UV absorption as well as improved gas and aroma barrier effect, this object is achieved according to the features disclosed herein. Additional inventive features are obtained as also disclosed herein in each case.

DETAILED DESCRIPTION OF THE INVENTION

In accordance with the invention, polyamide nanocomposite materials are produced by admixing an organically-modified phyllosilicate in a compounding process by means of a double-screw extruder (e.g. a "WP ZSK 25" of Werner & Pfleiderer). For the tests performed in connection with the present invention, the following screw geometries were used by taking the percentage number of screw elements per screw area into account:

Employed screw geometries (Table 1):

| Worm elements | Screw D Screw region | | | Screw E Screw region | | | Screw F Screw region | | |
|---|---|---|---|---|---|---|---|---|---|
| | K | L | M | K | L | M | K | L | M |
| Conveyor elements | 86 | 40 | 85 | 53 | 100 | 72 | 70 | 50 | 70 |
| Left conveyor elements (retarding) | — | 20 | 4 | 7 | — | — | — | — | — |
| Kneading blocks | 14 | 20 | 7 | 20 | — | 8 | 24 | — | 9 |
| Kneading blocks (not conveying) | — | — | — | 20 | — | — | — | — | — |
| Kneading blocks (left conveying) | — | 20 | 4 | — | — | 3 | 6 | — | 3 |
| Mixing elements (left conveying) | — | — | — | — | — | 6 | — | 17 | 6 |
| Spacing disks 1 mm | — | — | — | — | — | 11 | — | 23 | 12 |

Legend on Table 1:
Screw regions:
K Front-feeder up to dosing of modified layer mineral
L Dosing of modified layer mineral up to side feeder
M Side feeder up to die In the case of screw D, the dosing of the modified layer mineral into the melt is not possible.

In order to determine the film note (FN), a flat film is extruded from the granulate, e.g. with a "Plasti-Corder" of Brabender Co. For a period of 20 minutes the film is moved past an optical system which detects the impurities in the film, counts them (stated in m$^2$) and determines their size. Such an optical system with an evaluation programme is sold by OCS GmbH Witten under the name of "Folientest FT4" (Film Test FT4).

The impurities are subdivided into 10 size classes (cf. Table 2). These classes are weighted with different weighting factors.

TABLE 2

| Size class [μm] | Weight factor (fi) |
|---|---|
| <100 | 0.1 |
| 100-200 | 1 |
| 200-300 | 10 |
| 300-400 | 20 |
| 400-500 | 30 |
| 500-600 | 40 |
| 600-700 | 55 |
| 700-800 | 100 |
| 800-900 | 200 |
| >900 | 350 |

The film note is calculated according to the following formula by adding the sum totals of the weighted impurities per size class and by division by 1000.

$$FN = \frac{\sum_{i=1}^{10} xi \cdot fi}{1000} \quad (1)$$

The following applies:
xi=Impurities/m2/size class
fi=Weight factors

Phyllosilicates within the terms of the invention are understood as 1:1 as well as 2:1 phyllosilicates. In such systems, layers of $SiO_4$ tetrahedrons are regularly linked with such made of $M(O,OH)_6$ octahedrons. M stands for metal ions such as Al, Mg, Fe. In 1:1 phyllosilicates one tetrahedron layer and an octahedron layer are linked with each other. Examples are kaolin and serpentine minerals.

In the case of 2:1 three-layer silicates, two tetrahedron layers are each combined with one octahedron layer. If not all octahedron places are occupied with cations of the required charge for compensating the negative charge of the $SiO_4$ tetrahedrons and the hydroxide ions, charged layers will occur. This negative charge is compensated by the insertion of monovalent cations such as potassium, sodium or lithium or bivalent cations such as calcium in the space between the layers. Examples for 2:1 phyllosilicates are French chalk, mica, vermiculite, illites and bentonites, with the bentonites, which include montmorillonite and hectorite among others, being easily swellable with water as a result of their layer charge. Moreover, cations are easily accessible for exchange processes.

The layer thicknesses of the phyllosilicates are usually 0.5 nm to 2.0 nm prior to swelling, especially preferably 0.8 nm to 1.5 nm (distance of the upper edge of the layer to the next following upper edge of the layer). It is possible to further increase the layer distance, such that the phyllosilicate is converted with polyamide monomers (swelling), e.g. at temperatures of 25° C. to 300° C., preferably 80° C. to 280° C. and especially 80° C. to 160° C. over a dwell time of usually 5 to 120 minutes, preferably 10 to 60 minutes. Depending on the dwell time and the type of the chosen monomer, the layer distance will additionally increase by 1 nm to 15 nm, preferably 1 nm to 5 nm. The length of the platelets is usually up to 800 nm, preferably up to 400 nm. Any existing or constituting pre-polymers usually also contribute to the swelling of the phyllosilicates.

The swellable phyllosilicates are characterized by their ion exchange capacity CEC (meq/g) and their layer distance $d_L$. Typical values for CEC are at 0.7 to 0.8 meq/g. The layer distance in a dry, untreated montmorillonite is at 1 nm and increases by swelling with water or application with organic compounds to values up to 5 nm.

Examples for cations which can be used for exchange reactions are ammonium salts of primary amines with at least six carbon atoms such as hexanamine, decanamine, dodecanamine, stearylamine, hydrogenated fatty acid amines or even quarternary ammonium compounds such as ammonium salts of α-,ω- amino acids with at least six carbon atoms.

Suitable anions are chlorides, sulphates or even phosphates. In addition to ammonium salts, it is also possible to use sulphonium or phosphonium salts such as tetraphenyl or tetrabutyl phosphonium halogenides.

Since polymers and minerals have very different surface tensions, bonding agents can also be used in accordance with the invention for treating the minerals in addition to the cation exchange. Titanates or even hydrosilicons such as γ-aminopropyl triethoxysilane.

The invention will now be explained in closer detail by reference to the following examples and results:

As examples in accordance with the invention, two polyamide nanocomposite formulations were produced with addi tions of organically-modified phyllosilicates of 5 wt. % and 8 wt. %. An amorphous, partly aromatic copolyamide 6I/6T (isophthalic acid/terephthalic acid=2/1) was used as a polyamide matrix which is obtainable on the market under the name Grivory G21 of EMS-CHEMIE AG.

As a comparative example a PA 6 which is obtainable on the market under the name "Grilon F 40 NL" of EMS-CHEMIE AG was produced with 5 wt. % of modified phyllosilicate. The production of the polyamide nanocomposites was made by the addition of specially modified phyllosilicate.

In accordance with the invention, it is now possible, as already described above, to use phyllosilicates which were modified with onium ions. Such modified phyllosilicates can be obtained on the market from several firms such as Südchemie (D), Southern Clay Products (USA), Nanocor (USA), CO-OP (J). The modified phyllosilicates used for the comparative examples and examples in accordance with the invention concern montmorillonite treated with quarternary ammonium ions. The ligands of the nitrogen are methyl, hydroxyethyl and hydrogenated tallow or non-hydrogenated tallow.

The compounded materials was thereafter granulated and dried for 24 hours in vacuum at 90° C. The compounded polyamide phyllosilicate materials were processed on a casting film unit of Dr. Collin GmbH, extruder type "3300 D30× 25D", take-off type "136/350" into films in the following manner. The granulates were molten in a conventional single-screw, three-heat-zone extruder with a temperature profile of 250° C. to 260° C. The melt was drawn off through a sheet die with a die gap of 0.5 mm directly onto a cooling roller with a take-off speed of 8 m per minute and with a set temperature of 130° C.

Films with a thickness of approximately 50 μm have been produced with the above setup:

No phyllosilicates were added in the comparative examples I (aliphatic polyamide) and III (partly aromatic polyamide). Examples IV and V represent a combination in accordance with the invention of partly aromatic polyamide and phyllosilicates.

| Comparative example I | PA 6 | "Grilon F40 NL" |
| Comparative example II | PA 6 | +5 wt. % of phyllosilicate |
| Comparative example III | PA 6I/6T | "Grivory G21" |
| Inventive example IV | PA 6I/6T | +5 wt. % of phyllosilicate |
| Inventive example V | PA 6I/6T | +8 wt. % of phyllosilicate |

The following measurements were performed on the materials of the comparative examples and the films produced according to the inventive examples:

The oxygen transmission rate (OTR) was measured by means of the Mocon measuring instrument of type "Oxtrans 100" at 23° C. and at 0% relative humidity and at 85% relative humidity ("r.h."; cf. Table 3).

The UV absorption values were determined by means of a Perkin-Elmer Lambda "15 UV/VIS" spectrophotometer. The measurements were performed in a wavelength region of 200 nm to 400 nm. The recording of the light transmission occurred in the measured wavelength region on a scale between 0% and 100%. The evaluation in the improvement of the UV barrier was made by comparing the surfaces under the absorption curves of different films, with comparative example III, which only contained Grivory G21 without phyllosilicate addition, being set as 100.

In addition, the light transmission was also determined in the visible wavelength region of 550 nm, leading to an indication of the transparency of the film. The established values are compiled in Table 3 below.

TABLE 3

| | Oxygen permeability | | % transmission of | |
| --- | --- | --- | --- | --- |
| | cm3/m2 day bar 23° C./0% r.h. | cm3/m2 day bar 23° C./85% r.h. | UV in comparison with Grivory G21 at 200 to 400 nm | Light at 550 nm |
| Comparative example I | 25 | 70 | 63 | 70 |
| Comparative example II | 12 | 30 | 55 | 65 |
| Comparative example III | 30 | 10 | 100 | 92 |
| Example IV | 14 | 5 | 79 | 85 |
| Example V | 13 | 4 | 63 | 82 |

As is shown by the measurement results of the two examples IV and V in accordance with the invention, these films show strongly improved values relating to oxygen diffusion and UV absorption as compared with the comparative examples. The relatively good values as shown in Table 3 under the comparative examples I and II for UV absorptions of PA 6 film samples can be explained with a reduced transparency relative to the 6I/6T variants. The measurement of the light transmission values at 550 nm clearly show this reduced light transmitting capacity.

The employed polyamides containing aromatic groups also come with a favourable UV barrier effect, although these polyamides also have a high transparency. The addition of a phyllosilicate to these special polyamides further increases the favourable UV barrier without substantially impairing the excellent transparency of these products.

The following tables compare exemplary parameters of the method in accordance with the invention with parameters of the comparative examples:

Base polymer A (Table 4):

| Test No. | Dosing point for base polymer A | Modified phyllosilicate Type | Quantity [wt. %] | Dosing point | Throughput [kg/h] | Vacuum [mbar] | Screw | Film grade |
|---|---|---|---|---|---|---|---|---|
| Comp. ex. 1 | Front-feeder | G | 5 | Front-feeder | 10 | 150 | D | * |
| Comp. ex. 2 | Front-feeder | G | 5 | SF | 15 | 150 | D | * |
| Comp. ex. 3 | Front-feeder | G | 5 | MB | 20 | 150 | D | * |
| Comp. ex. 4 | Front-feeder + SF | G | 5 | Front-feeder | 20 | 150 | D | * |
| Comp. ex. 5 | Front-feeder + SF | G | 5 | Front-feeder | 20 | 150 | E | 9.19 |
| Example 1 | Front-feeder + SF | G | 5 | Melt | 20 | 150 | E | 0.67 |
| Example 2 | Front-feeder + SF | H | 4.5 | Melt | 20 | 150 | E | 0.21 |
| Example 3 | Front-feeder + SF | G | 5 | Melt | 20 | 50 | F | 1.80 |
| Example 4 | Front-feeder + SF | H | 4.5 | Melt | 20 | 50 | F | 0.80 |

PA 6I/6T was used each time as base polymer. The change to another screw improved the film quality in comparative example 5 to such an extent that a film degree can be determined. A film degree of around 10 is insufficient however. A strong improvement in the film degree is achieved only by a combination of all measures in accordance with the invention (cf. examples 1 to 4).

Base polymer B (Table 5):

| Test No. | Dosing point for base polymer B | Modified phyllosilicate Type | Quantity [wt. %] | Dosing point | Throughput [kg/h] | Vacuum [mbar] | Screw | Film grade |
|---|---|---|---|---|---|---|---|---|
| Comp. ex. 6 | Front-feeder | G | 5 | SF | 15 | 150 | D | * |
| Comp. ex. 7 | Front-feeder + SF | G | 5 | Front-feeder | 20 | 150 | D | ** |
| Comp. ex. 8 | Front-feeder + SF | G | 5 | Front-feeder | 20 | 150 | E | 11.62 |
| Example 5 | Front-feeder + SF | G | 5 | Melt | 20 | 150 | E | 0.37 |
| Example 6 | Front-feeder + SF | H | 4.5 | Melt | 20 | 150 | E | 0.62 |
| Example 7 | Front-feeder + SF | G | 5 | Melt | 20 | 50 | F | 1.43 |

PA 6/PA 6I/6T Blend was used in each case as base polymer B. In the comparative example 7, the split-up of the base polymer B into two parts and the dosing of the same at different places already leads to an improvement in the film quality. The determination of a film degree is only enabled when also the screw geometry is changed. A very strong improvement in the film degree is achieved again, only by the combination of all measures in accordance with the invention (cf. examples 5 to 7).

PA MXD6/MXDI was used in each case as base polymer C. As a result of the split-up of the base polymer into two parts and the dosing of the same at different locations of the extruder, an improvement in the film quality is achieved in comparative example 11 as well. The determination of a film degree is also only enabled when the screw geometry is changed. Depending on the employed phyllosilicate, a strong improvement in the film degree is achieved only through a renewed change in the screw geometry and the combination of all measures in accordance with the invention (cf. examples 8 to 10).

Legend in connection with Tables 4 to 6:
SF: Side-feeder
MB: Masterbatch:
  $1^{st}$ extrusion: Production of MB (ratio granulate: mod. phyllosilicate is approx. 70/30). Both in front-feeder.

Base polymer C (Table 6):

| Test No. | Dosing point for base polymer C | Modified phyllosilicate Type | Quantity [wt. %] | Dosing point | Throughput [kg/h] | Vacuum [mbar] | Screw | Film grade |
|---|---|---|---|---|---|---|---|---|
| Comp. ex. 9 | Front-feeder | G | 5 | Front-feeder | 10 | 150 | D | * |
| Comp. ex. 10 | Front-feeder | G | 5 | SF | 15 | 150 | D | * |
| Comp. ex. 11 | Front-feeder + SF | G | 5 | Front-feeder | 20 | 150 | D | ** |
| Comp. ex. 12 | Front-feeder + SF | G | 5 | Front-feeder | 20 | 150 | E | 21.02 |
| Example 8 | Front-feeder + SF | H | 4.5 | Melt | 20 | 150 | E | 3.40 |
| Example 9 | Front-feeder + SF | G | 5 | Melt | 20 | 50 | F | 4.40 |
| Example 10 | Front-feeder + SF | G | 3.2 | Melt | 20 | 50 | F | 5.61 |

2nd extrusion: Incorporation of MB in residual granulate. Both in front-feeder.

Mod. Phyllosilicate:
G Montmorillonite, modification; quarternary ammonium compound with methyl, bis-hydroxyethyl, hydrogenated tallow;
H Montmorillonite, modification; quarternary ammonium compound with methyl, bis-hydroxyethyl, tallow;

Screws:
D Dosing of the modified phyllosilicate in the melt not possible;
E No favourable mixing effect between phyllosilicate addition and side-feeder;
F Favourable mixing effect between phyllosilicate addition and side feeder;

Film degree:
* Very bad film quality: Determination of the film degree not possible.
** Bad film quality: Determination of the film degree not possible.

It was surprisingly noticed that the base film quality was obtained when a small part A (preferably 8 to 15 wt. %, especially preferably 10 to 12 wt. %) of the granulate of the base polymer is dosed in the front-feeder, but that the main part B is added at a later time via a side-feeder. The modified phyllosilicate (preferably 2 to 8 wt. %, more preferably 2 to 5 wt. %, especially preferably 2.5 to 5 wt. %) is dosed into the melt of the granulate portion A, preferably without using a side-feeder, simply by gravity. All data in wt. % relate to the sum total of the recipe components of 100 wt. %.

The extrusion parameters (low temperature profile, high speed, high throughput) and the screw geometry are preferably chosen in such a way that a high shearing is achieved. The speed of the screw is preferably more than 200 revolutions per minute (rpm). More preferably the speed is 300 rpm, and especially preferably the speed is 400 rpm.

The screw geometry is also relevant. It is necessary to ensure a favourable melting of the granulate portion A, e.g. by kneading blocks, before the phyllosilicate is added. After its addition and before the side-feeder it is necessary to provide a favourable mixing effect again. After the side-feeder it is necessary to provide a sufficient kneading and mixing effect. Measures which increase the dwell time also have a positive effect on the result, but should not lead to an excessive degradation of the base polymers. The employed screw geometries are summarized in Table 1. Moreover, the screw should preferably be configured in such a manner that for the purpose of degassing the application of vacuum before the die is enabled. A pressure or vacuum of less than 200 mbar is preferable; a pressure or vacuum of less than 50 mbar is especially preferable.

A high throughput is also preferable. A throughput of 20 kg/h in combination with these recipes constitutes the maximum amount possible for the employed double-screw extruder (WP ZSK 25). Generally, operations should be conducted in the upper quarter of the throughput and speed range of the employed extruder, preferably at the upper throughput and speed limit. The throughput limit is determined by the maximum possible torque at the desired low temperatures.

The temperatures set on the extruder must be chosen rather low relating to the melting point and the melt viscosity of the polymer. Temperatures are preferable which are 10° C. to 20° C. lower than in the incorporation of other filling materials. In the case of amorphous base polymers, 10° C. to 40° C. are mostly suitable, preferably temperatures which are 20° C. to 40° C. lower (relating to the entire T-profile on the extruder) than usual.

The following temperature profile was set for the processing of PA 6I/6T, PA 6/PA 6I/6T—Blends and PA MXD6/MXDI: Front-feeder 10° C., rising temperatures from 220° C. to 240° C., die temperature 240° C. Operations were conducted at a screw speed of 400 rpm.

The polyamide nanocomposites produced in accordance with the invention can be processed with conventional plastic processing methods into different articles, e.g. films, tubes, bags, bottles and containers. They can be produced either by monoextrusion or coextrusion methods. Suitable plastic processing methods are blow or cast film methods, extrusion blow moulding methods, transfer stretch-blow moulding, injection blow moulding, pipe extrusion methods and laminate methods.

Moreover, the use of the method in accordance with the invention for producing polyamide nanocomposites offers the possibility of producing moulded bodies, hollow bodies, semi-finished products, plates, pipes, etc. even with larger wall thicknesses. Preferred processing methods which are generally known comprise injection moulding, internal gas pressure, and profile extrusion methods as well as blow moulding by means of standard extrusion, 3D extrusion and vacuum blow moulding methods. Moulded bodies include for example radiator tubes, cooling water containers, compensating reservoirs and tubes and containers guiding other media (especially media with higher temperatures) as are used in the production of means of transport such as cars, airplanes, ships, etc.

The packaging articles can be arranged as a single-layer or multiple-layer packaging. In the case of multi-layer packaging, the polyamide nanocomposite material can be used as outside layer, intermediate layer or also as innermost layer in direct contact with the product.

A further embodiment of the invention also relates to the combination of said polyamide nanocomposites in combination with a multi-layer composite. The barrier effect of this layer is further improved by using phyllosilicates in a barrier layer. This allows reducing the layer thickness of the barrier layer for achieving a certain required barrier effect. Since the barrier material in multi-layer composites mostly represents the most expensive component of the packaging, the entire packaging system can thus be made cheaper. A further possibility for reducing the costs for the packaging is the outstanding UV barrier effect of the partly aromatic polyamide nanocomposites. The use of the expensive, special organic UV absorbers can be reduced or entirely eliminated by using these polymer formulations, thus avoiding further costs for the required packaging system. Organic UV absorbers are also subject to a certain migration, which may lead to problems concerning the foodstuff suitability of packaging materials.

Examples for possible applications of the present invention in the packaging field, without any limiting effect for the scope of validity of the invention, are packagings for semi-finished products and products such as foodstuffs, meat products, cheese and milk products, toothpastes, cosmetic products, beverages, paint, varnishes or detergents. Such packagings include toothpaste tubes, tubes for cosmetic products and foodstuffs, packagings for cosmetic products, body care, detergents, beverages, foodstuffs, etc.

Surprisingly, it was found that complex packaging problems can be solved by choosing special polyamides which are used as matrix polyamides and by special compounding methods. Potential polyamides are such which contain aromatic components. Suitable polyamides of this type can contain PA 6I/6T, PA 6/PA 6I/6T blends or co-polyamides produced from HMDA and/or MXDA and aliphatic and/or aromatic dicarboxylic acids. Moreover, the processing in accordance with the invention of polyamides based on lactams (lactam-6, -11, -12) or other polymers is possible.

Packaging produced by using the method in accordance with the invention offer extended durability to especially to perishable packaged goods which are sensitive to the permeability of packaging covers towards gases, especially oxygen and carbon dioxide. Such packaging also shows an improved barrier effect against spices and flavours such as distilled oils. The packaging also show an unexpected reduction in the transmission of UV light.

The invention claimed is:

1. A method for the production of a polyamide nano-composite made from at least one polyamide base polymer and an organically-modified phyllosilicate in a double-screw extruder with a front-feeder and a side-feeder,
   wherein a portion (A) of from 8 to 15 wt. % of a granulate of the base polymer, based on 100% by weight of the nanocomposite, is introduced in a dosed manner in the front-feeder of the double-screw extruder;
   and a main portion (B) of said granulate of the base polymer is introduced through the side-feeder of the double-screw extruder;
   wherein 2 to 8 wt. %, based on a total of 100% by weight of the nanocomposite, of the organically-modified phyllosilicate is introduced in a dosed manner by gravity and without the use of a side-feeder into the melt of the granulate portion (A) of the base polymer;
   wherein an E or F extruder screw with screw regions K, L, and M is used, the screw region M comprising at least one conveying retarding mixing element;
   wherein the melt of the polyamide nanocomposite is subjected to a pressure of less than 200 mbar within the double-screw extruder;
   and wherein a film made of this polyamide nanocomposite has a film note (FN) of less than 10.

2. The method according to claim 1, wherein said portion (A) comprises 10 to 12 wt. % of the granulate of the base polymer, and wherein the organically-modified phyllosilicate comprises 2 to 5 wt. % based in each case on the total of 100 wt. % of the nanocomposite.

3. The method according to claim 1, wherein the at least one conveying retarding mixing element comprises 6 % of the M region.

4. The method according to claim 1, wherein the base polymer comprises at least one aromatic component.

5. The method according to claim 1, wherein the base polymer comprises a polymer made from at last one component selected from the group consisting of HMDA (Hexamethylenediamine), MXDA (meta-Xylenediamine), aliphatic and aromatic dicarboxylic acids.

6. The method according to claim 1, wherein the base polymer comprises at least one polymer made from a lactam.

7. The method according to claim 1, wherein the base polymer comprises PA 6, PA 6I/6T or PA 6 / PA 6I/6T blends or PA MXD6/MXDI.

8. The method according to claim 7, wherein an amorphous co-polyamide PA 6I/6T is used as base polymer.

9. The method according to claim 1, wherein modified three-layer silicates are used as organically-modified phyllosilicate.

10. The method according to claim 1, wherein transparent and clear packaging films are produced, the film note (FN) being defined by the term:

$$FN = \frac{\sum_{i=1}^{10} xi \cdot fi}{1000} \quad (1)$$

and wherein xi is defined as impurities/m$^2$/size class and fi is defined as weight factor.

11. The method according to claim 1, wherein the melt of the polyamide nanocomposite is subjected to a pressure of less than 50 mbar within the double-screw extruder.

* * * * *